Apr. 17, 1923.

H. F. KAELBLE

TRANSMISSION LOCK

Filed Aug. 14, 1922

1,452,203

2 Sheets-Sheet 2

WITNESSES

INVENTOR
H. F. Kaelble,
BY
ATTORNEYS

Patented Apr. 17, 1923.

1,452,203

UNITED STATES PATENT OFFICE.

HERMAN F. KAELBLE, OF EGG HARBOR CITY, NEW JERSEY.

TRANSMISSION LOCK.

Application filed August 14, 1922. Serial No. 581,735.

*To all whom it may concern:*

Be it known that I, HERMAN F. KAELBLE, a citizen of the United States, and resident of Egg Harbor City, in the county of Atlantic and State of New Jersey, have invented certain new and useful Improvements in Transmission Locks, of which the following is a specification.

My invention is a lock for transmissions of motor vehicles of a well known type of construction, and it consists in the combinations, constructions and arrangements herein described and claimed.

An object of my invention is to provide a device of the character described which affords facilities whereby the propeller shaft of a vehicle to which the device is applied may be held connected with the driving shaft of the engine of the vehicle and the driving shaft of the engine may be held against rotation, thereby precluding the operation of the engine and the propelling or towing of the vehicle until desired, and thus precluding theft or unauthorized use of the vehicle.

A further object of the invention is to provide a device of the character described which is adapted to be readily applied to the transmission of a motor vehicle of ordinary construction without any extensive changes being required in the construction of the latter.

A still further object of the invention is to provide a device of the character described which is relatively simple in construction, not likely to get out of order easily and which is thoroughly practical commercially.

Other objects and advantages will be apparent from the following description, and the novel features of the invention will be particularly outlined in the appended claims.

My invention is illustrated in the accompanying drawings, forming a part of this application, in which—

Figure 1:
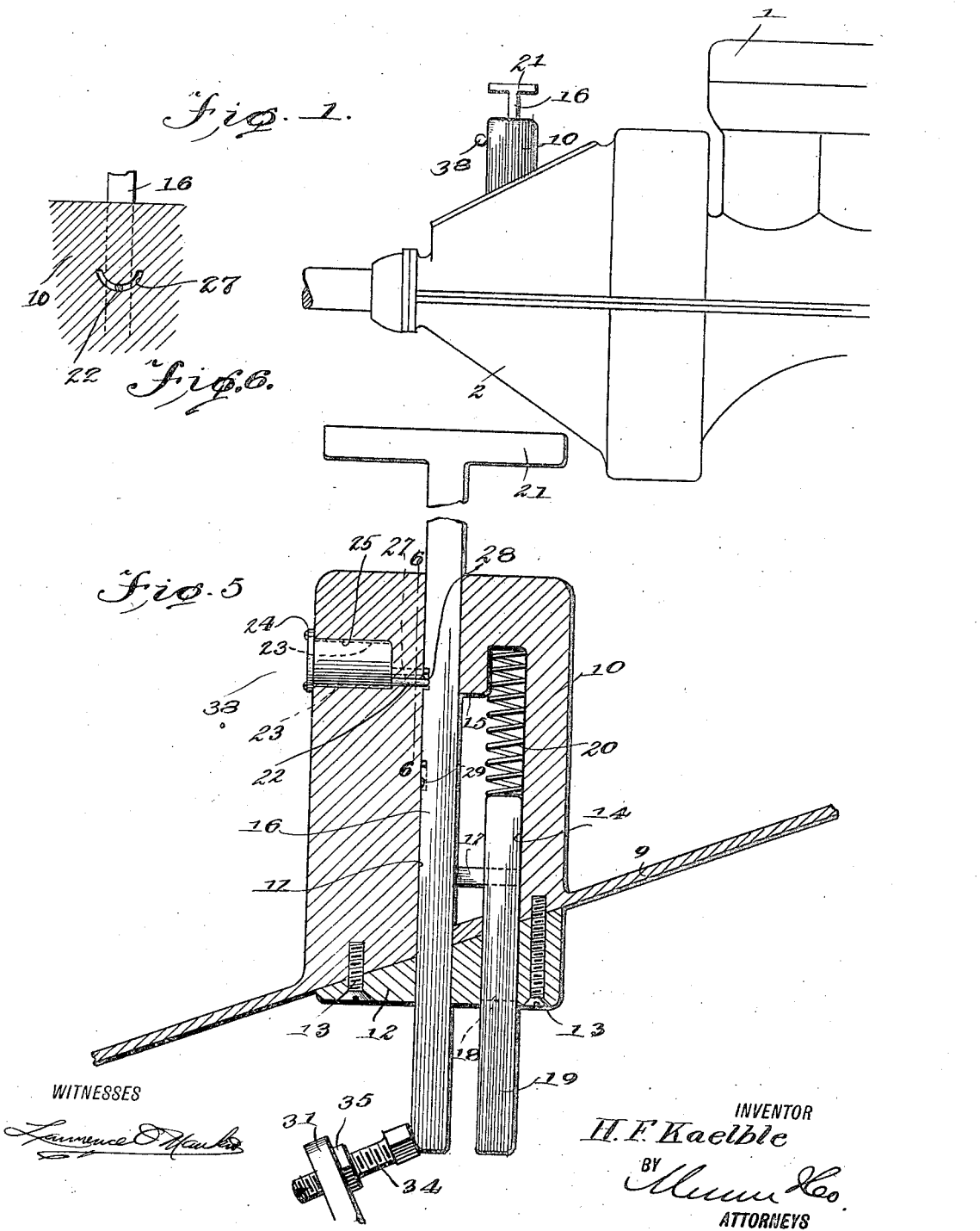
Figure 2:
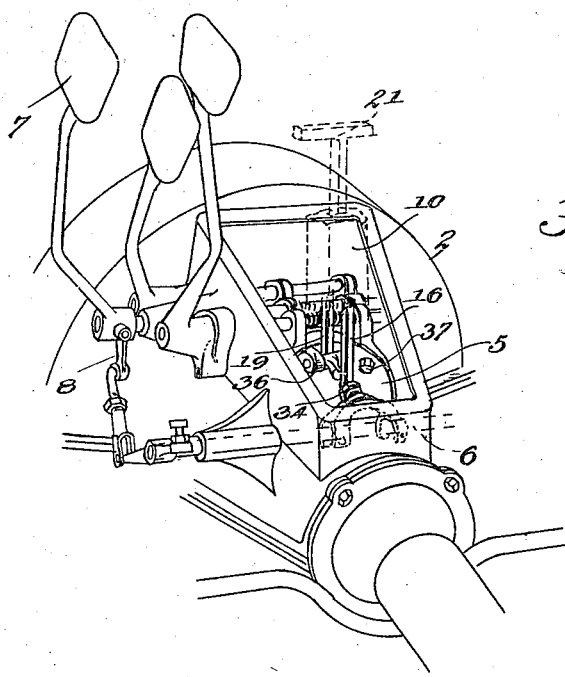
Figure 3:
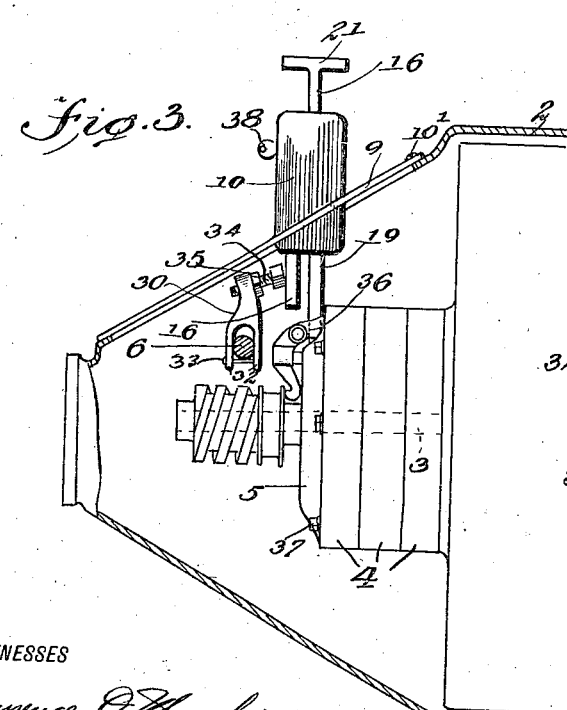
Figure 4:
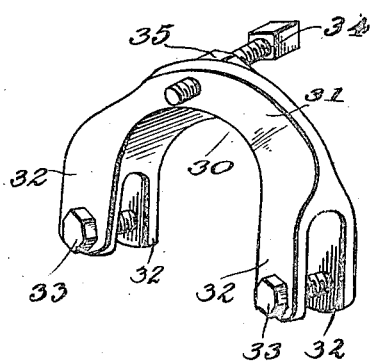

Figure 1 is a side elevation of a transmission and portion of an engine having a practical embodiment of the invention applied thereto, Figure 2 is a perspective view of the structure shown in Figure 1 with the usual transmission cover plate removed and showing a pedal controlled operating lever associated with the transmission, Figure 3 is a fragmentary longitudinal sectional view, showing the manner in which a clutch lever shaft and the driving plate comprised in the transmission illustrated in the preceding views may be held against functioning by locking elements of the device, Figure 4 is a relatively enlarged perspective view showing a keeper or stop comprised in the device, Figure 5 is a relatively enlarged fragmentary longitudinal section through the device in detached position, and Figure 6 is a fragmentary vertical section along the line 6—6 of Figure 5.

Referring now to the drawings, I show in Fig. 1 a fragmentary portion of an engine block 1 and 2 is the transmission housing associated with the engine block in the usual manner. A transmission shaft 3 extends within the transmission housing 2 of transmissions of the type of construction illustrated and is connected with the driving shaft, not shown, of the engine to turn with the latter. The portion of the transmission shaft 3 extending within the housing 2 carries the usual drums 4, with which is associated the driving plate 5, the latter being secured to the transmission shaft to rotate therewith. A clutch lever shaft 6 extends transversely through the transmission housing and is adapted when operated through the agency of a clutch pedal 7 and a suitable connecting arrangement such as indicated at 8 to control the operation of the usual clutch means, whereby the transmission shaft may be connected with or disconnected from the propeller shaft at will.

The parts described so far are ordinary in construction and form no part of my invention except in so far as they cooperate with the parts which will now be described.

In carrying my invention into effect, the usual transmission cover plate is removed and is replaced by a base plate 9 comprised in the device and which is adapted to be secured to the transmission cover or housing by screws 10' or the like in position to close the opening through the transmission cover. The base plate 9 carries a block 10, the longitudinal axis of which is vertically disposed when the base plate 9 is supported in inclined position on the transmission cover, as shown. An axial bore 11 extends through the block 10 and the plate 9 as well as through a lower cover plate 12 which is removably secured by screws 13 or like fastening means to the under side of the base plate 9 substantially in axial alignment with the block 10. A socket 14 extends through the cover plate or block 12 into the block 10 in spaced parallel relation to the bore 11 and terminates at its upper end at an appreciable distance from the upper end of the block 10. The socket 14 is in communication with the bore 11 through a slot 15 extending from the upper face of the lower cover block 12 to a determined distance from the upper end of the socket 14.

A plunger slidable in the bore 11 has a lateral pin or stud projection 17, being integral therewith, which pin or stud projection extends through the slot 15 into a longitudinally extending slot 18 formed through a plunger 19 that is slidable in the pocket or socket 14. A coiled expansion spring 20 disposed in the pocket 14 between the upper end of the plunger 19 and the end wall of the pocket reacts against the former to urge it downwardly in the pocket to extended position, as illustrated.

The plunger 16 extends above the upper end of the block 10 and is provided at its upper end with a handle 21. The plunger 16 may be locked in an extended position with respect to the block 10, as illustrated in Figure 5, through the agency of an eccentrically mounted extending detent or pin portion 22 of a rotatable element 23 journaled in the cylinder 24 of a lock which is secured in a transversely extending socket 25 formed in the block 10, the said detent working in an arcuate slot 27 extending from the inner end of the socket 25 to the bore 11 and being adapted to enter a notch 28 formed in the adjacent side of the plunger 16. A notch 29 in the plunger 16 is similar to the notch 28 but at a lower level and is adapted to be engaged by the locking pin 22 to hold the plunger 16 in retracted position so that the lower end of the plunger will terminate substantially flush with the lower face of the cover block 12.

A stud or keeper 30 cooperating with the plunger 16 comprises a substantially U-shaped frame or yoke 31 having arms formed with bifurcated end portions, the bifurcations 32 of each arm being adapted to straddle the clutch lever shaft 6 and to be clamped to the latter by means of bolts 33 or the like, whereby the web or crown portion of the frame will be supported above the shaft 6. A bolt or screw 34 has a shank threadedly engaging a transverse or slightly inclined bore through the web or crown portion of the yoke and a head thus positioned laterally of the yoke and being adapted to engage the lower end portion of the plunger 16 when the latter is in extended position and to thus hold the shaft 6 against rotation. The length of the laterally extending portion of the bolt or screw 34 may be adjusted within the limits established by the length of the shank and head of the bolt or screw and may be locked in adjusted position by a lock or jam nut 35 screwed thereon against the adjacent side of the web portion of the yoke.

The plunger 19 when in extended position is adapted to engage with the supporting lug 36 on the driving plate for the usual clutch finger and my invention also contemplates the replacing of the usual driving plate screws by screws 37 having heads of sufficient length to extend into the path of the extended lower end portion of the plunger 19 and to engage with the latter upon attempted rotation of the transmission shaft 3, thereby providing a plurality of spaced apart stop members adapted to engage with the extended plunger 19 to secure the holding of the transmission shaft against rotation without any appreciable rotative movement being permitted before the plunger 19 is engaged by one of the stops 36 or one of the stops 37.

From the foregoing description of the various parts of the device, the operation thereof may be readily understood. When the plunger 16 is in extended position and in engagement with the stop or keeper 30, the clutch lever shaft will be held in such position that the propeller shaft will be locked to the transmission shaft. In consequence the rotation of the propeller shaft and of the ground wheels of a vehicle equipped with my invention independent of rotation of the transmission shaft is prevented. As soon as the plunger 16 is moved downwardly toward extended position, the action of the spring 20 will cause a like movement of the plunger 19 and the latter will engage one of the stops 36 or 37, thus holding the transmission shaft against rotation. With the propeller shaft locked to the transmission shaft and the transmission shaft held against rotation, it will be apparent that a braking action is obtained and that the vehicle equipped with the invention cannot then be propelled, towed or the engine of the vehicle operated until the clutch lever shaft and transmission shaft are released. Theft or unauthorized use of a motor vehicle equipped with the invention is therefore prevented. The plunger 16 may be locked in extended position by turning the key 38 for the lock to cause the pin 22 to engage the notch 28. When it is desired to release the propeller shaft and the transmission shaft, the key 38 is turned so that the pin 22 moves out of engagement with the notch 28. The handle 21 is then grasped and pulled upward to effect retraction of the plunger 16. As soon as the lateral projection 17 working in the slot 18 engages the upper end wall of the latter, further upward movement of the plunger occasions a like movement of the plunger 19 against the action of the spring 20. The plungers 16 and 19 will be moved to retracted or inactive positions simultaneously and may be locked in such positions by turning the key 38 so that the extension 22 will engage the notch 29. The block 10 is preferably integral with the base plate 9 so that access to the interior of the transmission casing or to the working parts of the device is prevented when the base plate 9 is securely fastened to the transmission cover. The cover block is disposed within the transmission casing and access to the screws 13 therefore cannot be had when the block 10 is in applied position on the transmission cover. Assembly, adjustment or replacement of the relatively moving parts or elements of the device can therefore be effected by an authorized person although it is impossible for an unauthorized person to gain access to the interior of the transmission housing and to the working parts of the device with a view to rendering the latter ineffectve for the purpose intended without very heavy tools being required to dislodge the block 10 from its connection.

Obviously, my invention is susceptible of embodiment in forms other than that illustrated in the accompanying drawings, and I therefore consider as my own all modifications and adaptations of the form of the device herein disclosed, which fairly fall within the scope of the appended claims.

Having thus described the invention, what I claim is:—

1. The combination with a transmission casing having an opening through the walls thereof and having a clutch lever shaft extending therethrough, of a base plate adapted to be secured to the casing in position to cover the opening, a block integral with said base plate and extending exteriorly of the casing, said block having a longitudinal bore formed therethrough and a socket therein in spaced parallel relation to the bore and opening through the lower face of the base plate, said socket being in communication intermediate of its length with said bore through a lateral slot, a plunger reciprocable in the bore and having a handle at the upper end thereof, said plunger being of a length to extend within the transmission casing when in extended position with respect to the block, a stop carried by said clutch lever shaft in position to engage said locking plunger when the latter is in an extended position, a second plunger slidable in the socket, said second plunger having a longitudinal slot therethrough intermediate of its length, spring means urging said second plunger toward position to engage with stops on a plate within the transmission casing, and a lateral projection extending from said first named plunger into the slot of said second named plunger whereby movement of the latter independently of the former is limited.

2. The combination with a transmission casing having an opening through the walls thereof and having a clutch lever shaft extending therethrough, of a base plate adapted to be secured to the casing in position to cover the opening, a block integral with said base plate and extending exteriorly of the casing, said block having a longitudinal bore formed therethrough and a socket therein in spaced parallel relation to the bore and opening through the lower face of the base plate, said socket being in communication intermediate of its length with said bore through a lateral slot, a plunger reciprocable in the bore and having a handle at the upper end thereof, said plunger being of a length to extend within the transmission casing when in extended position with respect to the block, a stop carried by said clutch lever shaft in position to engage said locking plunger when the latter is in an extended position, a second plunger slidable in the socket, said second plunger having a longitudinal slot therethrough intermediate of its length, spring means urging said second plunger toward position to engage with stops on a plate within the transmission casing, a lateral projection extending from said first named plunger into the slot of said second named plunger whereby movement of the latter independently of the former is limited, and means carried by said block and engageable with said first named plunger to releasably hold the latter in extended or retracted position as desired.

3. As an article of manufacture, a lock comprising a base plate adapted to replace the usual cover plate of a transmission casing of ordinary construction, a block integral with said base plate and having a longitudinal bore extending therethrough, said block having a socket opening through the lower face of the base plate and extending through the block in parallel relation to the bore to terminate short of the other end of the block, said socket being in communication intermediate of its length with said bore through a lateral slot, a locking plunger slidable in the bore and extending beyond the upper end of the block and the lower face of the base plate, a second plunger slidable in the socket and being spring pressed downwardly, said second plunger having a longitudinal slot therein, and a lateral projection extending from said first plunger into the slot of the second plunger, whereby a determined upward movement of the first plunger will occasion a like movement of the second plunger, said plungers being adapted when in downwardly extended position to be engaged by elements rotatably supported within the transmission casing and to then prevent rotation of such elements.

HERMAN F. KAELBLE.